US007929764B2

(12) United States Patent
Daniels et al.

(10) Patent No.: US 7,929,764 B2
(45) Date of Patent: Apr. 19, 2011

(54) IDENTIFYING CHARACTER INFORMATION IN MEDIA CONTENT

(75) Inventors: Gary L Daniels, Duvall, WA (US); Bradley Kerth, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 977 days.

(21) Appl. No.: 11/763,936

(22) Filed: Jun. 15, 2007

(65) Prior Publication Data

US 2008/0310722 A1 Dec. 18, 2008

(51) Int. Cl.
*G06K 9/00* (2006.01)
(52) U.S. Cl. .................. 382/182; 382/181; 382/209
(58) Field of Classification Search .............. 382/181, 382/182, 184, 209
See application file for complete search history.

(56) References Cited

U.S. PATENT DOCUMENTS

| 5,550,966 | A | 8/1996 | Drake et al. |
| 6,101,274 | A | 8/2000 | Pizano et al. |
| 6,587,586 | B1 | 7/2003 | Cui et al. |
| 7,024,020 | B2 * | 4/2006 | Lee et al. ............ 382/103 |
| 7,426,301 | B2 * | 9/2008 | Porikli ............ 382/181 |
| 2003/0121053 | A1 | 6/2003 | Honda |
| 2004/0008277 | A1 | 1/2004 | Nagaishi et al. |
| 2007/0058856 | A1 | 3/2007 | Boregowda et al. |
| 2010/0054696 | A1 * | 3/2010 | Doser et al. ............ 386/84 |

FOREIGN PATENT DOCUMENTS

| EP | 1074926 | A3 | 2/2001 |
| EP | 1460835 | A1 * | 9/2004 |
| EP | 1585348 | A1 | 10/2005 |
| WO | WO2005055618 | A1 | 6/2005 |
| WO | WO2006049249 | A1 | 5/2006 |

OTHER PUBLICATIONS

Chen, et al., "Text Identification in Complex Background Using SVM", retrieved on Apr. 4, 2007, at<<http://csdl2. computer.org/persagen/DLAbsToc.jsp?resourcePath=/dl/proceedings/&toc=comp/proceedings/cvpr/2001/1272/02/1272toc.xml&DOI=10.1109/CVPR.2001.991021>>, IEEE, 2001, pp. 1-2.
Wang, et al., "Video quality assessment based on structural distortion measurement", available at least as early as Apr. 4, 2007, at <<http://www.cns.nyu.edu/~zwang/files/papers/vssim.pdf>>, vol. 19, No. 2, 2004, pp. 1-9.
Zhang, et al., "Detection of text captions in compressed domain video", available at least as early as Apr. 4, 2007, at <<http://delivery.acm.org/10.1145/360000/357934/p201-zhang.pdf?key1=357934&key2=3613665711&coll=GUIDE&dl=GUIDE&CFID=19059920& CFTOKEN=86564598>>, ACM, 2000, pp. 201-204.

* cited by examiner

*Primary Examiner* — Bhavesh M Mehta
*Assistant Examiner* — Stephen R Koziol
(74) *Attorney, Agent, or Firm* — Lee & Hayes, PLLC

(57) ABSTRACT

Implementations of identifying character information in media content are described. In one implementation, a frame of media content is marked with a frame identifier including one or more known characters. These known characters can uniquely identify the frame of media content. During transmission, compression, decompression, etc., of the frame, loss can occur. This loss can affect a quality of presentation of one or more of the known characters in the frame identifier. Therefore, when the frame is subsequently examined, the frame identifier can be identified, and best matches of known characters from a character recognition library can be found for characters in the frame identifier.

16 Claims, 7 Drawing Sheets

IDENTIFYING CHARACTER INFORMATION IN MEDIA CONTENT

BACKGROUND

In modern society, proliferation of media content, including video content, is widespread. As media content is copied and/or transferred between devices, several quality issues can arise.

One such quality issue is the loss of information in media content. Loss of information can come in several forms. For instance, loss of information can include the dropping of entire frames of media content from a file. This type of loss of information can occur in many scenarios, including when media content is coded and decoded, streamed over a network, subjected to network interruptions, etc.

Loss of information can also occur when information in a single frame of media content is dropped. For example, portions of information within a frame of media content can be lost when the frame is compressed and decompressed.

In addition to loss, media content can also experience quality issues when synchronization fails. For example, due to the various factors above, different components within the media content, such as audio content and video content, can become unsynchronized. As a result video content may be erroneously rendered before or after corresponding audio content is rendered.

SUMMARY

Implementations of identifying character information in media content are described. In one implementation, a frame of media content is marked with a frame identifier including one or more known characters. These known characters can uniquely identify the frame of media content.

During transmission, compression, decompression, etc., of the frame, loss can occur. This loss can affect a quality of presentation of one or more of the known characters in the frame identifier, transforming the known characters into characters of frame identification information.

The frame identifier can be recreated from the characters of frame identification information by comparing the characters in the frame identification information to a set of known characters in a character recognition library. Best matches from the known characters can be used to replace the characters in the frame identification information, thus recreating the frame identifier.

A degree of similarity with which the characters in the frame identification information match the known characters in the character recognition library can be used to compute a quality of resolution of the frame of media content. Moreover, if several frames of media content include frame identifiers which are sequential numbers or codes, it can be quickly established that one or more frames have been dropped when breaks are found in the sequence of frame identifiers.

This summary is provided to introduce a selection of concepts that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to techniques for identifying character information in media content. More particularly, the techniques described herein involve recognizing frame identification information corresponding to a frame identifier in a frame of media content. The frame identification information can include one or more characters, which themselves are copies of known characters. However, the characters in the frame identification information can have experienced loss of information during transmission and/or rendering processes.

One or more of the characters in the frame identification information can be compared against a set of known characters from a character recognition library and matched on a best match basis. Known characters corresponding to the characters in the frame identification information can then be used to recreate the frame identifier for the frame of media content.

In one implementation, a degree of similarity between the characters in the frame identification information and the matched known characters in the frame identifier can be used to compute a quality of resolution of the frame of media content. Moreover, in another implementation, if several frames of media content include frame identifiers which are sequential numbers or codes, it can be quickly established that one or more frames have been dropped when breaks are found in the sequence of frame identifiers.

Exemplary Environment

Figure 1:
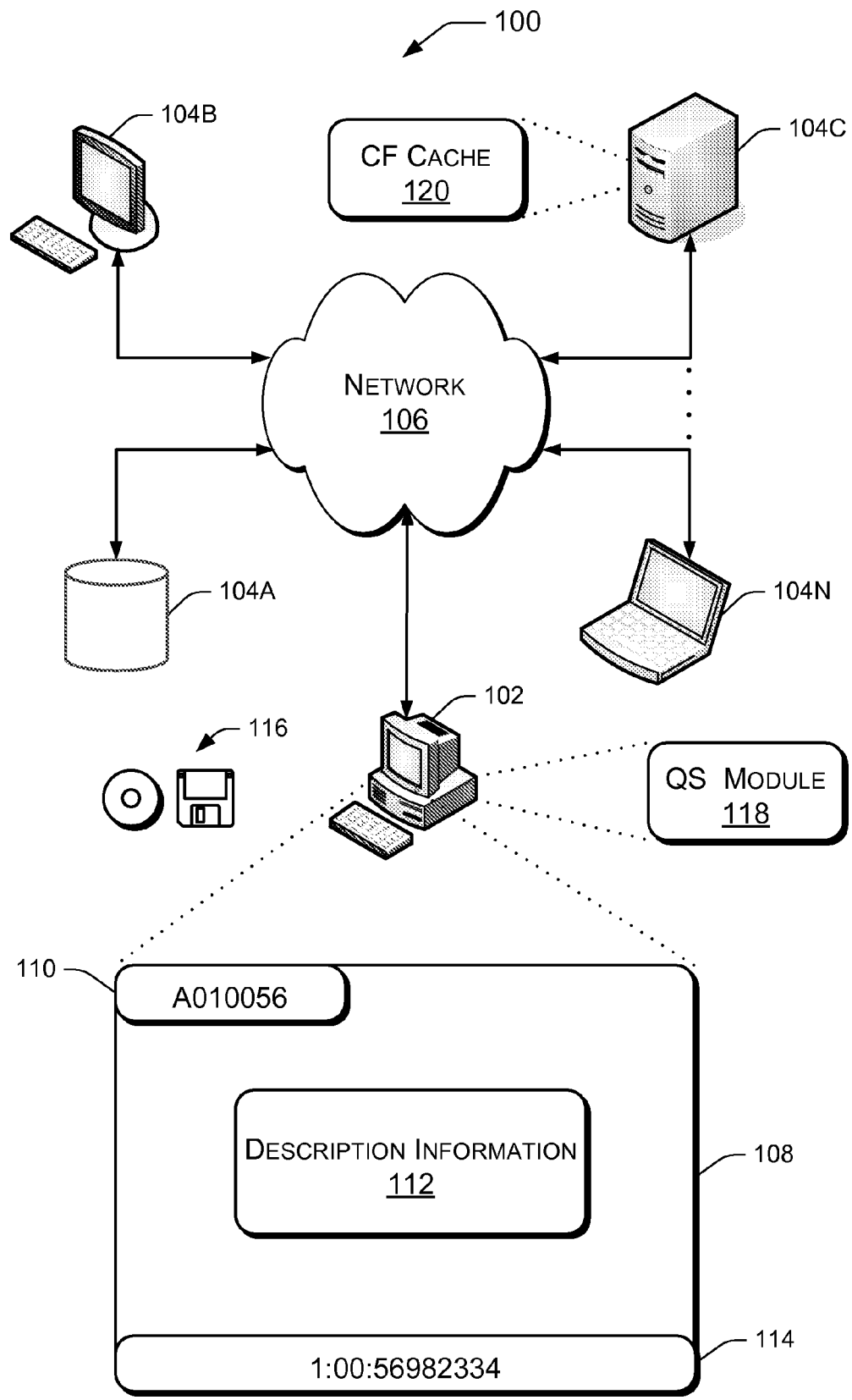
FIG. 1 illustrates an exemplary environment in which identifying character information in media content may be implemented.

FIG. 1 illustrates an exemplary environment 100 in which identifying character information in media content may be implemented. Environment 100 includes a client device 102 which can be placed in communication with a variety of computing-based devices 104A-N via a network 106. Client device 102 can include any computing-based device which can be used to render media content. For example, client device 102 can include a server, a game console, a desktop PC, a notebook or portable computer, a workstation, a mainframe computer, an Internet appliance, a mobile phone, a personal digital assistant (PDA), a printer, and so on. Similarly media content can include any file or data structure through which information may be presented to a user. For example, media content can include files having video and/or audio components, such as motion pictures experts group (MPEG) files, windows media video (WMV) files, audio video interleaved (AVI) files, etc.

Network 106 can include any wired and/or wireline coupling known in the art capable of placing two or more computing-based devices in electronic communication. Examples of network 106 include a local area network (LAN), a wide area network (WAN), the Internet, a conventional telephone network, a cellular network, any combination thereof, etc.

Devices 104A-N with which client device 102 may communicate (and from which client 102 can receive one or more files of media content) can include any computing-based devices known in the art. For example, devices 104A-N can include a storage device 104A, a PC 104B, a server 104C, and so on.

A file of media content received at client device 102 can be instrumented such that one or more frames 108 of video content within the media content can include a frame identifier 110. Frame identifier 110 can include one or more characters which identify frame 108. Characters in frame identifier 110 can include any symbols known in the art. In one implementation, characters in frame identifier 110 can include a collection of one or more numbers and/or letters, such as roman letters, uniquely identifying frame 108. Further, in another possible implementation, if frame 108 is part of a sequence of frames, each frame 108 can have a sequential frame identifier 108 indicating a unique place frame 108 occupies in the sequence of frames. In such an implementation, frame 108 could be preceded by a frame having a frame identifier 110 of, for example, "A100055". Similarly, frame 108 could be succeeded by a frame having a frame identifier 110 of, for example, "A100057".

In another possible implementation, frame identifiers 110 can be placed in a same location in each frame 108. Further, in another possible implementation, characters in frame identifiers 110 can all be of a same font and font size (i.e. same height, etc). In still another possible implementation, the characters in frame identifiers 110 can be defined to be of a specific color, and can be placed against a specific background color. For example, the characters in frame identifier 110 can be chosen to be black, while the background can be chosen to be white. In still another possible implementation, the characters in frame identifier 110 can be set such that kerning, that is overlap of characters, is avoided. Additionally, frame identifier 110 can be formed such that frame identifier 110 can be read by a human, such as a system administrator.

Frames 108 in the video content can also be instrumented to include description information 112 and/or presentation times 114. Description information 112 can include any information describing a file to which frame 108 is a part. For example, description 112 can include information such as a number of frames included in the video content, a format of the video content, a length (in time or frames) of the video content, etc. In one implementation, description information 112 is presented in the first few frames 108 of the video content.

Presentation time 114 can include information regarding a time of presentation of frame 108. For example, presentation time 114 can include a time of recordation of frame 108. In one implementation, presentation time 114 can be given in units of 100 nanoseconds. As will be discussed in more detail below, presentation time 114 can be used in conjunction with frame identifier 110 to determine if frame 108 is being rendered correctly.

Each of frame identifier 110, description information 112, and presentation time 114 can be shown on a display of client device 102 when frame 108 is rendered. Alternately, either or both of frame identifier 110 and presentation time 114 can be hidden from a user viewing frame 108 on client device 102. For example, either or both of frame identifier 110 and presentation time 114 can be found in a margin such as an overscan area, not rendered on the display of client device 102.

Moreover, presentation time 114 can be omitted from frame 108 entirely. In such an implementation, presentation time 114 can be stored separately from frame 108, but be associated with frame 108 via frame identifier 110. For example, a control file related to the file of media content of which frame 108 is a part can include a table relating frame identifiers 108 to their corresponding presentation times 114.

In addition to video content in a file of media content received at client device 102 being instrumented, audio content in the file of media content can also be instrumented. For example, portions of the audio content can be instrumented with identifiers such as frequency information, or with any other technique or technology known in the art. In this way, portions of audio content in the media content can be associated with frames 108 of video content in the file of media content.

Stated another way, if a frame 108 of video content is intended to be rendered at a same time as a portion of audio content, frame identifier 110 of frame 108 and a corresponding frame identifier of the portion of audio content can be associated or linked together. For example, frame identifier 110 of frame 108 and the frame identifier of the portion of audio content can be the same. Alternately, frame identifier 110 and the frame identifier of the audio content can be different, however their association can be saved in a data structure, such as a table.

As noted above, frame 108 can be a portion of a file of media content being rendered by client device 102. The file of media content can be introduced to client device 102 in any way known in the art. For example, the file of media content can be transmitted to client device 102 from one or more of devices 104A-N via network 106. Alternately, the file of media content can be introduced to client device 102 via one or more portable storage media 116, such as optical discs, floppy discs, memory sticks, etc.

In one implementation, frame identifier 110 can be placed on frame 108 before frame 108 is introduced to client device 102. For example, frame identifier 110 can be placed on frame 108 at one of devices 104A-N. Alternately, frame identifier 110 can be placed on frame 108 when the media content of which frame 108 is a part is captured by a recording device, such as a digital camera, a video camera, etc.

The characters in frame identifier 110 can be taken from a character recognition library of known characters. In one implementation, the character recognition library can be consulted after transmission and/or rendering of frame 108 to see if a quality of resolution of the characters in frame identifier 110 has suffered.

For example, a file of media content including frame 108 can be processed at a device 104A-N (such as device 104C). For instance media content can be downloaded from a digital video camera to a device 104A-N. A frame identifier 110 can be added to frame 108 on device 104A-N using known characters from a character recognition library stored on device 104A-N. Moreover, description information 112 can be added to frame 108 as well as to other frames in the file of media content. Further, presentation time 114 can be added to frame 108, representing a time in which frame 108 was recorded in accordance with a system clock on a device which originally recorded frame 108.

If the file of media content of which frame 108 is a part includes sequential frames, the frame preceding frame 108 can have a presentation time earlier than presentation time 114 of frame 108. Similarly, a frame intended to be rendered after frame 108 can have a presentation time later than presentation time 114 of frame 108.

After the media content is instrumented, the media content can be compressed and transmitted electronically from device 104A-N to client device 102 over network 106. Alternately, the media content can be compressed, stored on portable storage media 116, and physically be introduced to client device 102.

In some cases, the processes involved in transferring the media content from device 104A-N to client device 102, and in rendering the media content on client device 102, can result in loss of information in the media content. For instance, during transmission entire frames of media content can be dropped or corrupted, and information within surviving frames can be degraded or lost. Similarly, during rendering processes, such as decompressing processes, decoding processes, and so on, entire frames of media content can be dropped or corrupted, and information within surviving frames can be degraded or lost.

The loss and/or degradation of information in the media content can include loss and/or degradation of information in frame identifier 110 in frame 108. Thus, frame identifier 110 can be degraded into frame identification information including characters which are no longer exact copies of the known characters used to initially populate frame identifier 110.

At client 102, the frame identification information corresponding to frame identifiers in the frames of the media content can be examined. For example, a quality sampling (QS) module 118 in client device 102 can compare the characters extant in the frame identification information against the original, known characters used to create frame identifier 110. In one implementation this can involve separating out all individual characters in the frame identification information at client 102. Separation of individual characters out from the frame identification information can be done using any method known in the art, and will be discussed in more detail in conjunction with FIG. 3 below.

Once separation has occurred, the individual characters in the frame identification information can be compared against known characters in the character recognition library stored on device 104A-N and/or client device 102. In this way, a best match between the characters separated out from the frame identification information and the known characters in the character recognition library used to initially create frame identifier 110 can be found. Finding a best match between the characters separated out from the frame identification information and the known characters in character recognition library can be done using any method known in the art.

Once known characters from the character recognition library have been found for each character in the frame identification information in frame 108 at device 102, the known characters can be used by QS module 118 to recreate frame identifier 110. For example, frame identifier 110 included in frame of media content 108 before transmission of frame of media content 108 to client 102 can be identified as the known characters corresponding to the characters in the frame identification information.

Additionally, a degree to which the characters in the frame identification information are similar to their corresponding known character equivalents from the character recognition library can be used to calculate a quality of resolution of the frame identification information at client 102. For example, if the characters in the frame identification information are ninety five percent similar to the known characters used to recreate frame identifier 110, then QS module 118 can register that the frame identification information in frame of media content 108 at client 102 has a quality of resolution of ninety five percent.

The degree to which the characters in the frame identification information are similar to their corresponding known character equivalents in the character recognition library can be calculated using any method known in the art.

Once the quality of resolution of the frame identification information is calculated or otherwise determined, QS module 118 can use the quality of resolution of the frame identification information to evaluate a quality of resolution frame 108. For example, the frame identification information can be viewed as a representative sample of frame 108, and thus the quality of resolution of the frame identification information can also be seen as the quality for resolution of the remaining information in frame 108.

In one implementation, calculation of the quality of resolution of the frame identification information and/or the quality of resolution of frame 108 can be done in real time as the media content of which frame 108 is a part is rendered on client device 102.

In addition to being useful in calculating the qualities of resolution of the frame identification information and frame 108, the known characters matched to characters in the frame identification information at device 102 can also be used by QS module 118 for a variety of other uses, which will be discussed in more detail in conjunction with FIG. 2 below. For example, recreated frame identifiers 110 can be used to search for the occurrence of missing frames in the media content being rendered at client 102. For example, missing frames can be detected by looking for missing frame identifiers 110.

Moreover, QS module 118 can use frame identifiers 110 to determine if frames 108 are being rendered correctly, and to determine if media functions on a media content player on client device 102, such as fast forward, seek, rewind, etc., are functioning properly. Further, frame identifiers 110 can be used by QS module 118 to determine if video content and audio content in the media content of which frame 108 is a part are being rendered in synch with one another.

Additionally QS module 118 can use frame identifier 110 to conduct a comprehensive examination of a quality of resolution of frame 108 rendered at client 102. For example, frame identifier 110 for frame 108 at client 102 can be identified as described above. Frame identifier 110 can then be used to access an original copy of frame 108, which has not undergone any transmission or rendering processes. The original copy of frame 108 can be saved in a control frame (CF) cache 120 on one or more of devices 104A-N (such as device 104C as illustrated in FIG. 1).

Frame 108 at client device 102 can then be compared to the original copy of frame 108 residing in CF cache 120 using any method known in the art. For example, each pixel in frame 108 can be compared to each corresponding pixel in copy of frame 108 residing in CF cache 120. In one implementation, such a comparison of frame 108 with frame 108 residing in CF cache 120 can be done outside of the realm of real time. For instance, the comparison can be done after frame 108 has been rendered at client device 102.

Exemplary Client Device

Figure 2:
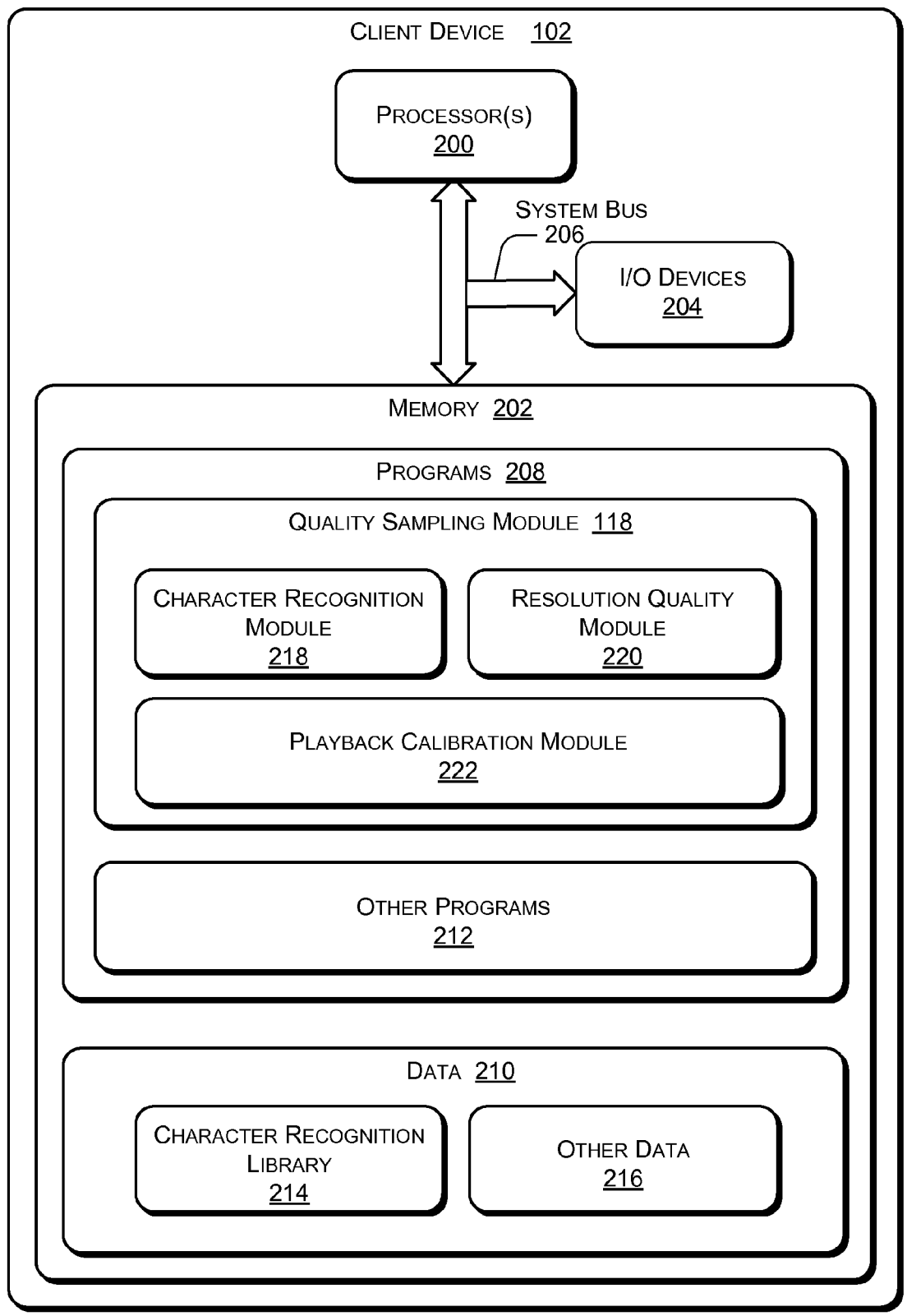
FIG. 2 illustrates an exemplary client device on which identifying character information in media content may be implemented.

FIG. 2 illustrates various components of client device 102 according to one embodiment of identifying character information in media content. Client device 102 can include one or more processor(s) 200, a memory 202, input/output (I/O)

devices 204 (e.g., keyboard, display, and mouse), and a system bus 206 operatively coupling the various components of client device 102.

System bus 206 represents any of several types of bus structures, including a memory bus or memory controller, a peripheral bus, an accelerated graphics port, and a processor bus or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, a peripheral component interconnects (PCI) bus also known as a mezzanine bus, a PCI express bus, a universal serial bus (USB), a secure digital (SD) bus, and an IEEE 1394 (i.e., FireWire) bus.

Memory 202 can include computer-readable media in the form of volatile memory, such as RAM and/or non-volatile memory, such as ROM, or flash RAM. Memory 202 can also include data and program modules for implementing identifying character information in media content which are immediately accessible to, and presently operated on, by processor(s) 200.

Memory 202 can include programs 208 and data 210. Programs 208 can include quality sampling (QS) module 118 as well as other programs 212, including web browsing applications, instant messaging applications, word processing applications, spreadsheet applications, media content players, and so on. Data 210 can include a character recognition library 214 and other data 216, such as data associated with a general functioning of one or more programs—such as QS module 118 and other programs(s) 212.

Character recognition library 214 can include all of the original known characters used to create frame identifier 110 in frame 108. The known characters in character recognition library 214 can be of a same font, size and so on, as the characters in frame identifier 110. Moreover, as mentioned above, even though character recognition library 214 is illustrated as residing on client device 102, character recognition library 214 can also reside on other devices such as device 104A-N in addition to, or instead of, on client device 102.

In one implementation, QS module 118 can include a character recognition module 218, a resolution quality module 220, and a playback calibration module 222. In operation, media content can be received at client device 102 from any source, including devices 104A-N and portable storage media 116. Moreover, as noted above, information from the media content can be lost as the media content is transferred to client device 102 and rendered at client device 102.

Character recognition module 218 can process the media content by recognizing and identifying individual characters within frame identification information corresponding to frame identifiers 110 in individual frames 108 of the media content. Character recognition module 218 can recognize individual characters in frame identification information and recreate corresponding frame identifiers 110 using any method known in the art.

Figure 3:
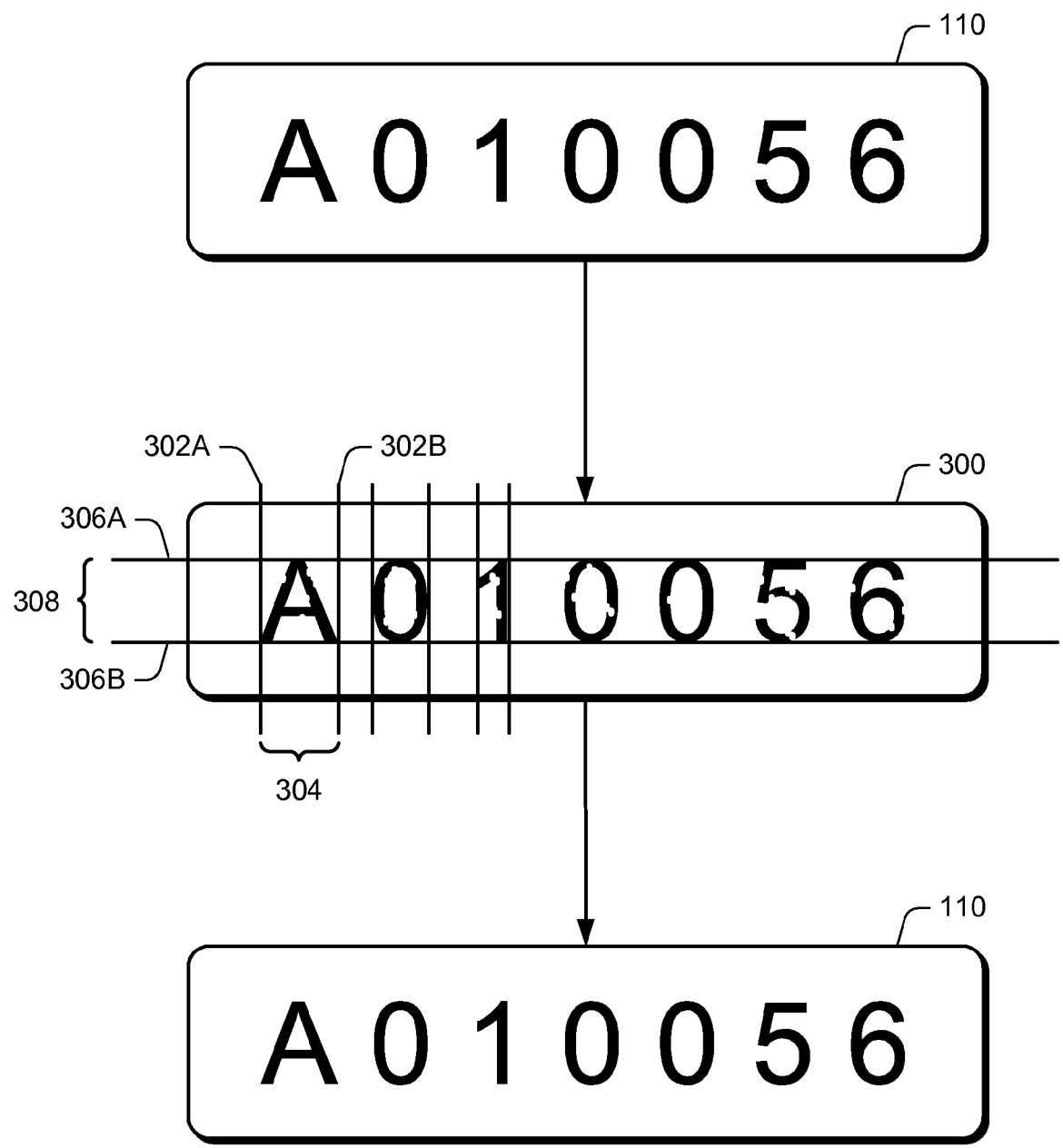
FIG. 3 illustrates an exemplary process for recognizing individual characters within a frame identifier.

FIG. 3 illustrates one possible way in which character recognition module 218 can recognize individual characters within frame identifier 110. As shown, frame identifier 110 can be transferred and rendered at client device 102, resulting in frame identification information 300. Character resolution module 218 can recognize frame identification information 300 in frame 108 and separate out individual characters in frame identification information 300. These individual characters can then be compared against the known characters in character recognition library 214, and best matches from the known characters can be used to recreate frame identifier 110.

In one implementation, character recognition module 218 can set width boundaries 302A and 302B for one or more characters in frame identification information 300. For example, width boundary 302A can be placed at a far left edge of a character, while width boundary 302B can be set at a far right edge of the character. The space between width boundaries 302A, B for the character can be defined as a width 304 of the character.

Similarly, character recognition module 218 can set height boundaries 306A and 306B on one or more of the characters in frame identification information 300. For example, height boundary 306A can be set at a top edge of a character, while height boundary 306B can be set at a bottom edge of the character. The space between height boundaries 306A, B for the character can be defined as a height 308 of the character. In FIG. 3, each of the characters is illustrated as having a same height (namely height 308). It will be understood, however, that in instances where characters in frame identification information 300 have differing heights 308, different height boundaries 306A,B can be set for each such character.

Once height 308 and width 304 information exists for a character, an identity of the character can be sought. For example, character recognition module 218 can cause a search to be conducted in character recognition library 214 for known characters having heights and widths similar to height 308 and width 304. If more than one known character from character recognition library 214 has a height and width similar to height 308 and width 304, then any technique known in the art can be used to find which known character from character recognition library 214 is the most similar to the character in frame identification information 300. For example, similarities between pixels in the character in frame identification information 300 can be examined for each of the known characters in character recognition library 214 having a height and width similar to height 308 and width 304. The known character from character recognition library 214 being most similar to the character from frame identification information 300 can be deemed to be the identity of the character in frame identification information 300.

This process can be conducted by character recognition module 218 for each character in frame identification information 300. Once known characters have been found for each character in frame identification information 300, the characters in frame identification information 300 can be replaced by their corresponding known characters, thus recreating frame identifier 110.

It will be understood that use of the term "frame identification information 300" throughout this text refers to any frame identification information derived from frame identifier 110. Frame identification information 300 can have experienced any amount of loss—including no loss—due to transmission and rendering processes. Further, characters within frame identification information 300 can be recognized and identified using any methods known in the art, including those outlined above in conjunction with FIG. 3.

Returning to FIG. 2, once the characters in frame identification information 300 have been recognized, and known characters in character recognition library 214 have been identified which correspond to the characters in frame identification information 300, resolution quality module 220 can calculate a quality of resolution of frame identification information 300.

Resolution quality module 220 can use any method known in the art to calculate the quality of resolution of frame identification information 300. For example, resolution quality module 220 can calculate a degree to which the characters in frame identification information 300 are similar to their corresponding equivalent known characters in character recognition library 214.

In one implementation, the degree to which the characters in frame identification information 300 are similar to their corresponding equivalents in the character recognition library 214 can be calculated by comparing pixels. For instance, resolution quality module can compare a pixel having a color above a predetermined threshold in a character in frame identification information 300 to a corresponding pixel in the corresponding equivalent known character in character recognition library 214. If the pixel in the character in frame identification information 300 matches the pixel in the best match known character in character recognition library 214, then a match can be declared. Otherwise a pixel mismatch can be declared. This process can be repeated for each pixel above the predetermined threshold in the characters in frame identification information 300. In such a way, resolution quality module 220 can calculate the quality of resolution of frame identification information 300 as:

$$QOR \text{ of Frame } ID \text{ Info } 300 = \frac{\text{Number of Pixel Matches}}{\text{Number of Pixel Matches} + \text{Number of Pixel Mismatches}}$$

Once calculated, regardless of what method is used, resolution quality module 220 can use the quality of resolution of frame identification information 300 to determine a quality of resolution of frame 108. For example, frame identification information 300 can be viewed as a representative sample of frame 108, and thus resolution quality module 220 can evaluate the quality of resolution of frame 108 as being the same as the quality of resolution of frame identification information 300.

Resolution quality module 220 can also instigate a comprehensive examination of a quality of resolution of frame 108 rendered at client 102. For example, an identity of frame 108 can be identified by recreating frame identifier 110 from frame identification information 300 at client 102 as described above. Resolution quality module 220 can then use frame identifier 110 to instigate a comparison of frame 108 at client 102 against an original copy of frame 108 (having either the same frame identifier 110 as frame 108 at client device 102, or having a frame identifier associated with frame identifier 110). The original copy for frame 108 can be devoid of any loss from transmission or rendering processes, and can be saved in control frame (CF) cache 120 on one or more of devices 104A-N (such as device 104C as illustrated in FIG. 1).

Frame 108 can be compared with the copy of frame 108 residing in CF cache 120 using any method known in the art. For example, each pixel in frame 108 can be compared to each corresponding pixel in copy of frame 108 residing in CF cache 120. In one implementation, such a comparison of frame 108 with frame 108 residing in CF cache 120 can be done outside of the realm of real time. For instance, the comparison can be done after rendering of frame 108 has been completed at client device 102.

Playback calibration module 222 is configured to examine how well media content including frame 108 is rendered on client device 102. In one implementation, playback calibration module 222 can examine the media content for one or more missing frames.

For example, the media content of which frame 108 is a part can include sequentially ordered frames with sequentially ordered frame identifiers. Once frame identifier 110 of frame 108 is recreated by character recognition module 218, frame identifier 110 frame can be compared against a frame identifier of a preceding frame. If frame identifier 110 of frame 108 immediately follows the frame identifier of the preceding frame (i.e. frame identifier 110 of frame 108 is the next sequential designation in the sequence of frame identifiers), then playback calibration module 222 can deduce that no frames have been dropped. However, if frame identifier 110 of frame 108 does not follow the frame identifier of the preceding frame, then playback calibration module can register that frames have been dropped.

In one implementation, playback calibration module 222 can calculate the number of dropped frames as the number of missing frame identifiers in the sequence between the frame identifier of the preceding frame and frame identifier 110 of frame 108.

Playback calibration module 222 can also determine if frame 108 is being rendered correctly. For example, playback calibration module 222 can access an identity of frame 108 found by using frame identifier 110. This identity can be used by playback calibration module 222 to also access a presentation time, such as presentation time 114, associated with frame 108, which in turn can be used to determine if frame 108 is being rendered at a correct time and/or in a correct sequence.

For instance, playback calibration module 222 can determine an actual amount of time elapsed between a rendering of frame 108 and a rendering of a previously rendered frame. Playback calibration module 222 can compare this actual amount of time to an amount of time that would be expected to elapse between a rendering of the previously rendered frame and frame 108. Playback calibration module 222 can calculate this expected amount of time by subtracting a presentation time from the previously rendered frame from presentation time 114 of frame 108. If the expected amount of time is greater than the actual amount of time between the rendering of the previously rendered frame and frame 108, playback calibration module 222 can deduce that the media content of which frame 108 is a part is being rendered ahead of schedule. For instance, the rendering in frames per second can be too quick, or frames in the media content may have been dropped during transmission and/or rendering of the media content at client 102.

Alternately if the expected amount time between rendering of the previously rendered frame and frame 108 is less than the actual amount of time elapsed between rendering of the previously rendered frame and frame 108, playback calibration module 222 can deduce that the media content of which frame 108 is a part is being rendered behind schedule. For example, the rendering of frames per second of the media content at client 102 may be too slow.

In a similar manner, playback calibration module 222 can calibrate the functioning of media functions on a media content player by examining frame identifier 110 and/or presentation time 114 of frame 108. Media functions such as fast forward, seek, rewind, etc., can have an associated expected advance rate. For example, the expected advance rate for the seek function can be, for example, one minute of media content every time the seek function is activated. Similarly, the fast forward and reverse functions can have associated expected advance rates of several seconds of media content for each second of activation of the fast forward and reverse functions.

Playback calibration module 222 can calibrate the expected advance rates of the media functions by comparing an actual advance rate to the expected advance rate using frame identifiers. For example, if the seek function is selected, the expected jump caused by activation of the seek function can be compared to an actual jump effected by the seek function. For instance, if the seek function is supposed to jump forward one minute in the media content, then a presentation time of a frame jumped from can be subtracted from a presentation time of a frame jumped to. If the calculated time difference does not equal one minute, then playback calibration module can deduce that either the seek function should be recalibrated, or frames have been lost in the media content. Playback calibration module 222 can also take corrective actions, such as increasing or decreasing the number of frames jumped every time the seek function is activated, such that the expected advance rate equals an actual jump experienced by activation of the seek function.

As mentioned above, in one implementation, presentation times can be included on each frame of the media content. Alternately, if no presentation times are included on the frames of the media content, the presentation times can be found by referencing frame identifiers on the frames of the media content.

In a similar fashion, when fast forward or rewind functions are selected, playback calibration module 222 can calculate an expected advance time in the media content by multiplying an expected jump rate, (for example in seconds of media content per second of function activation) by an amount of time the forward or rewind function is activated. For example, if the fast forward function is supposed to advance the media content at a rate of three seconds for every second of activation, and if the fast forward function is activated for three seconds, the expected amount of media content advanced should be equal three times three seconds, or nine seconds.

The expected advance time can be compared to a real advance time found by viewing both a presentation time of a frame at the beginning of activation of the function and a presentation time of a frame at the end of activation of the function. If the difference in presentation times of the two frames does not equal the expected advance time, then a problem with the function can be implied by playback calibration module 222. In one implementation, playback calibration module can correct fast forward and rewind functions, by speeding up or slowing down the number of frames they advance per second of activation such that the an observed advance time equals an expected advance time.

As with above, in one implementation, presentation times can be included on each frame of the media content. Alternately, if no presentation times are included on the frames of the media content, the presentation times can be found by referencing frame identifiers on the frames of the media content.

Playback calibration module 222 can also check synchronization between audio and video content being rendered at client device 102. For example, when frame 108 is rendered, a portion of audio content being simultaneously rendered can be examined and a corresponding identifier for the portion of audio content can be identified. As mentioned above, audio content rendered at client device 102 can be instrumented with identifiers in any way known in the art. Moreover, these identifiers can be identified using any methods known in the art.

Once the identifier for the audio portion is known, it can be compared with frame identifier 110 for frame 108. If the identifier for the audio portion and frame identifier 110 are associated, then the video content is in synch with the audio content. Alternately, if frame identifier 108 is not associated with the identifier for the audio portion being rendered simultaneous to frame 108, then playback calibration module 222 can deduce that the video content and audio content are out of synch.

In the event that the video content and the audio content are out of synch, playback calibration module 222 can use any method known in the art to synch up the audio content and the video content. For example, if frame identifier 110 is ahead of the identifier for the portion of audio content, playback calibration module 222 can speed up rendering of the audio content relative to the video content. This can be continued until frame identifiers 110 and identifiers for portions of the audio content indicate that the audio content and the video content are synched up.

Alternately, if frame identifier 110 is behind the identifier for the portion of audio content, playback calibration module 222 can speed up rendering of the video content relative to the audio content. This can be continued until frame identifiers 110 and identifiers for portions of the audio content indicate that the audio content and the video content are synched up.

Exemplary Reputation Server

Figure 4:
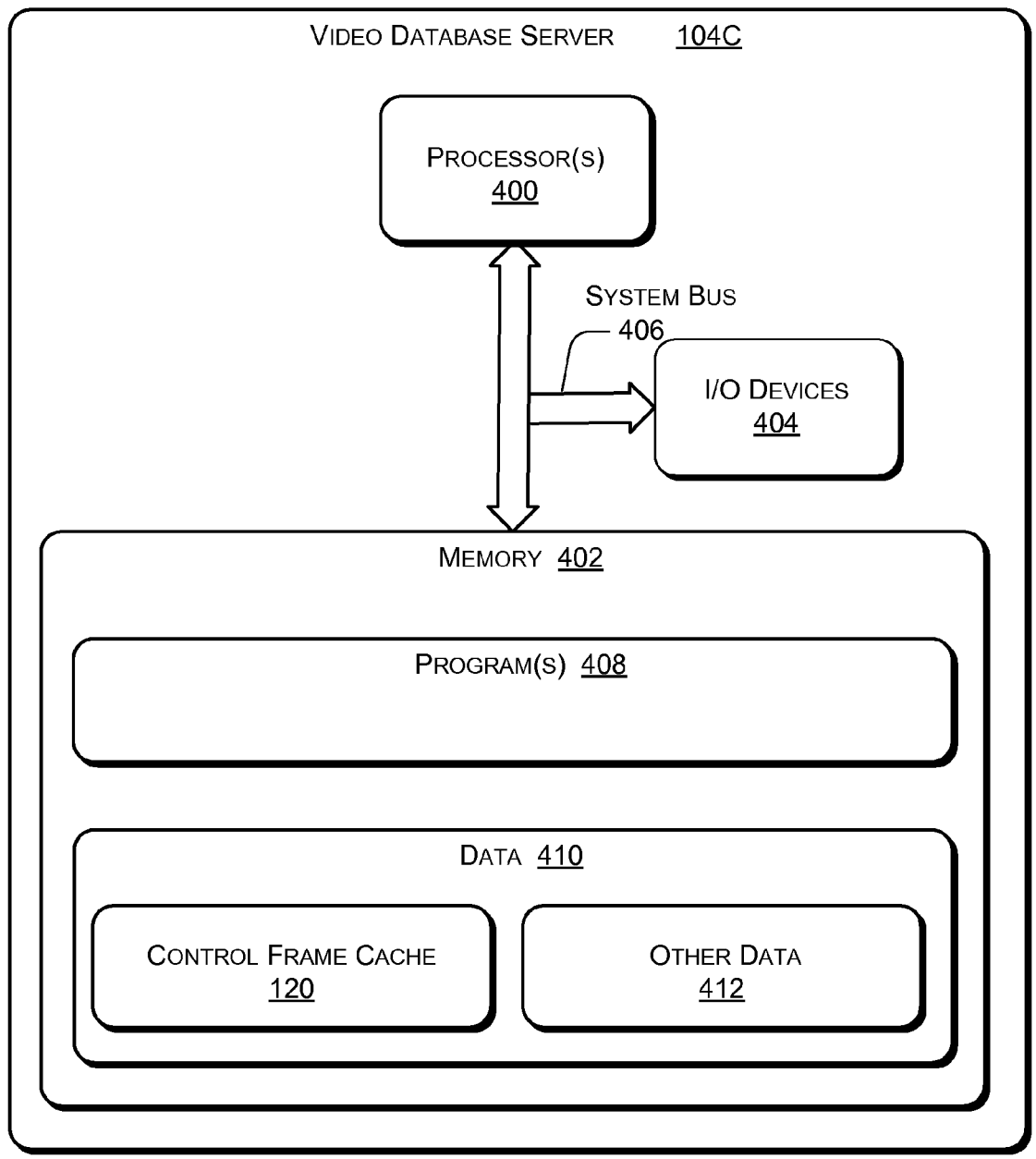
FIG. 4 illustrates an exemplary video database server on which aspects of identifying character information in media content may be implemented.

FIG. 4 illustrates various components of a video database server 104C including a control frame (CF) cache 120 in accordance with one embodiment of identifying character information in media content. Even though video database server 104C is shown as being device 104C from FIG. 1, it will be understood that any of devices 104A-N and/or client device 102, could have a similar functionality and host CF cache 120.

Video database server 104C can include one or more processor(s) 400, a memory 402, input/output (I/O) devices 404 (e.g., keyboard, display, and mouse), and a system bus 406 operatively coupling the various components of video database server 104C. System bus 406 represents any of several types of bus structures, including a memory bus or memory controller, a peripheral bus, an accelerated graphics port, and a processor bus or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, a peripheral component interconnects (PCI) bus also known as a mezzanine bus, a PCI express bus, a universal serial bus (USB), a secure digital (SD) bus, and an IEEE 1394 (i.e., FireWire) bus.

Memory 402 can include computer-readable media in the form of volatile memory, such as RAM and/or non-volatile memory, such as ROM, or flash RAM. Memory 402 can also include data and program modules for implementing identifying character information in media content which are immediately accessible to, and presently operated on, by processor(s) 400.

Memory 402 can include programs 408 and data 410. Programs 408 can include programs such as file sharing applications, web browsing applications, word processing applications, spreadsheet applications, etc. Data 410 can include CF cache 120 and other data 412, such as data associated with a general functioning of one or more programs—such as programs(s) 408.

As noted above, CF cache 120 can include original copies of frames of media content being rendered at client device 102, and CF cache 120 can be used by resolution quality module 220 to calculate a quality of resolution of frame 108. For example, once frame identifier 110 has been identified on device 102, frame 108 can be identified on the basis of frame identifier 110. Frame 108 can then be compared to an original copy of frame 108, stored in CF cache 120, wherein the original copy of frame 108 in CF cache 120 has not undergone any transmission or rendering processes.

Frame 108 can be compared with copy of frame 108 residing in CF cache 120 using any method known in the art. For example, each pixel in frame 108 can be compared to each corresponding pixel in copy of frame 108 residing in CF cache 120. In one implementation, such a comparison of frame 108 with copy of frame 108 residing in CF cache 120 can be done outside of the realm of real time. For instance, the comparison can be done after frame 108 has been rendered at client device 102.

Exemplary Methods

Figure 5:
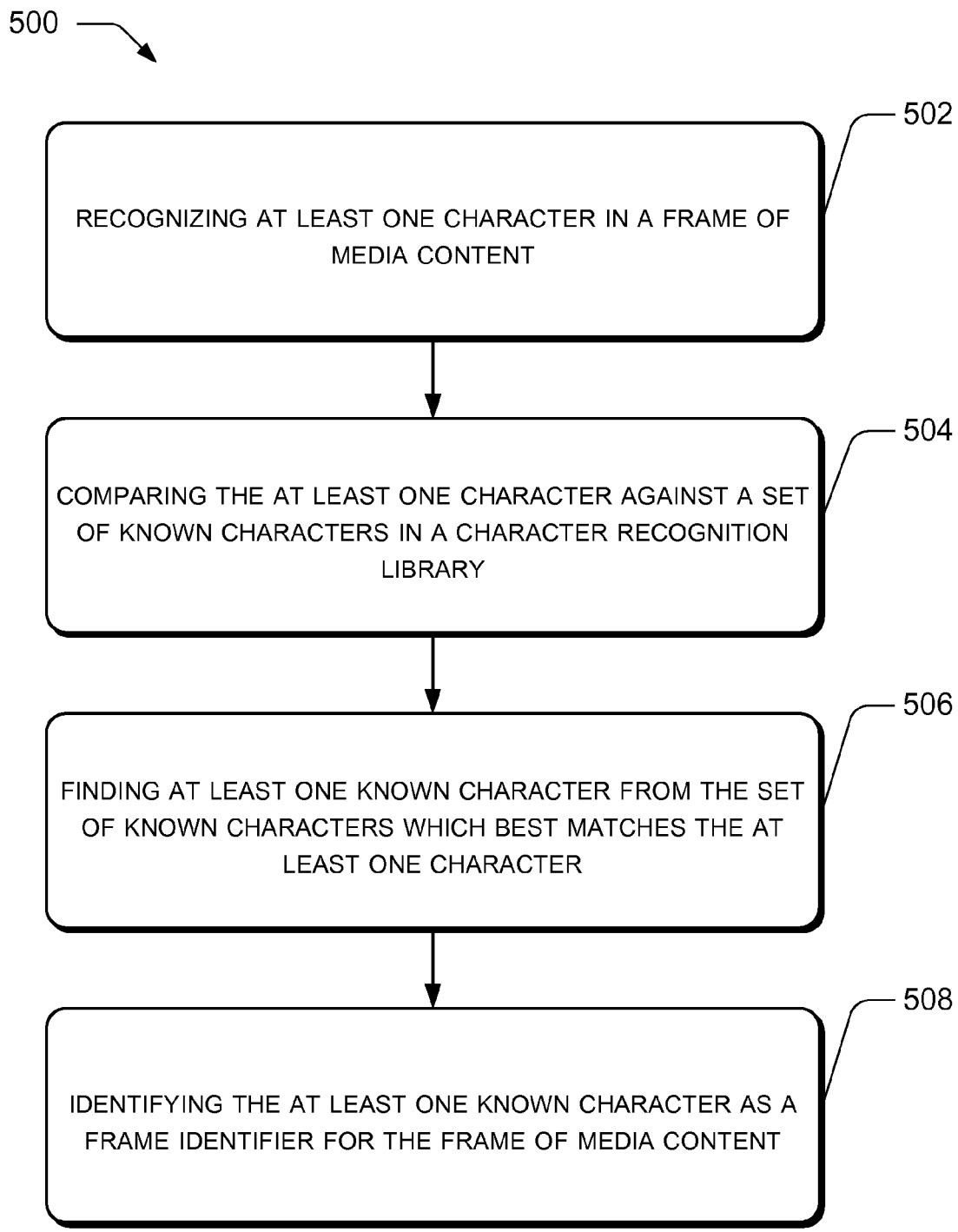
FIG. 5 illustrates an exemplary process for recognizing and identifying character information in media content.
Figure 6:
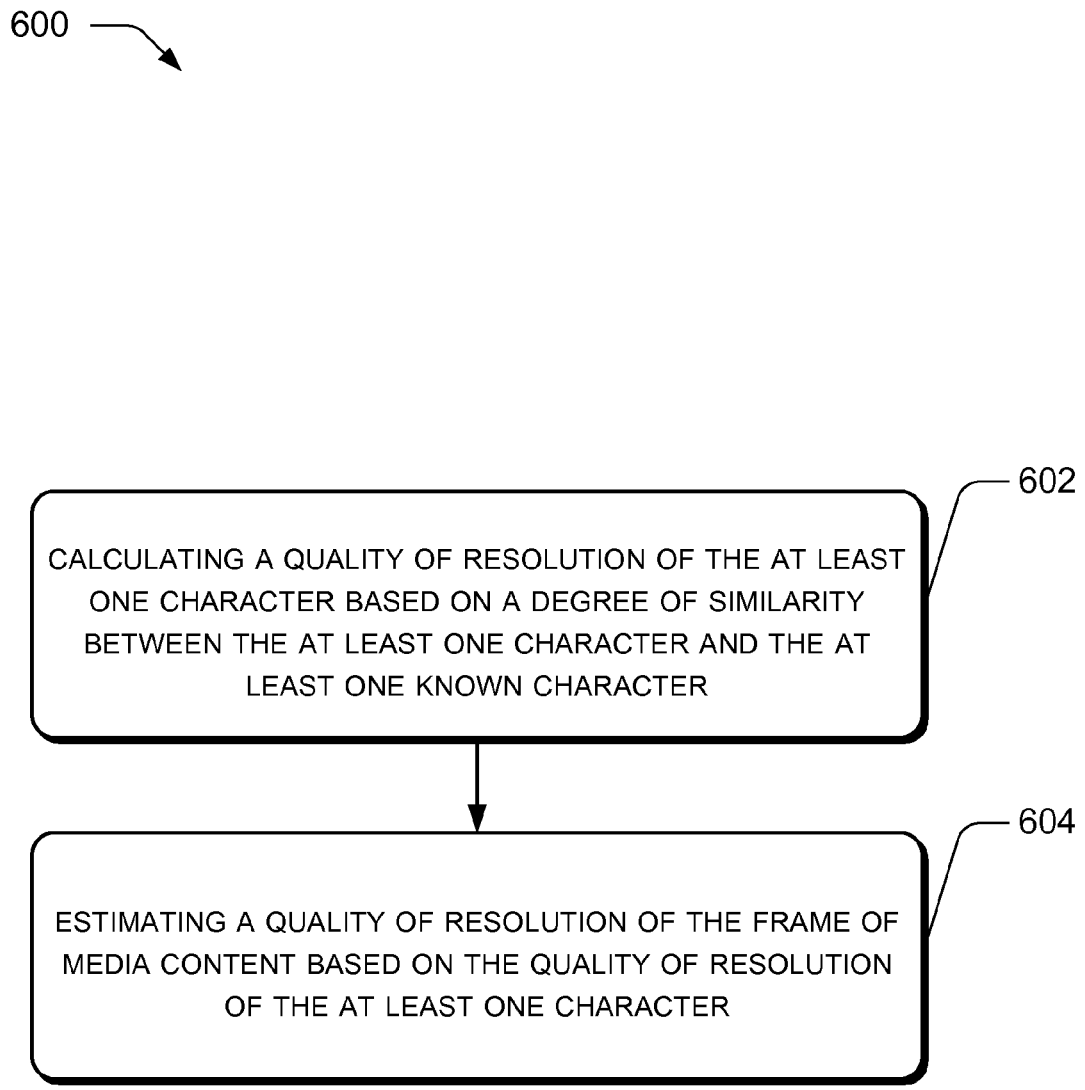
FIG. 6 illustrates an exemplary process for estimating a quality of resolution of a frame of media content.
Figure 7:
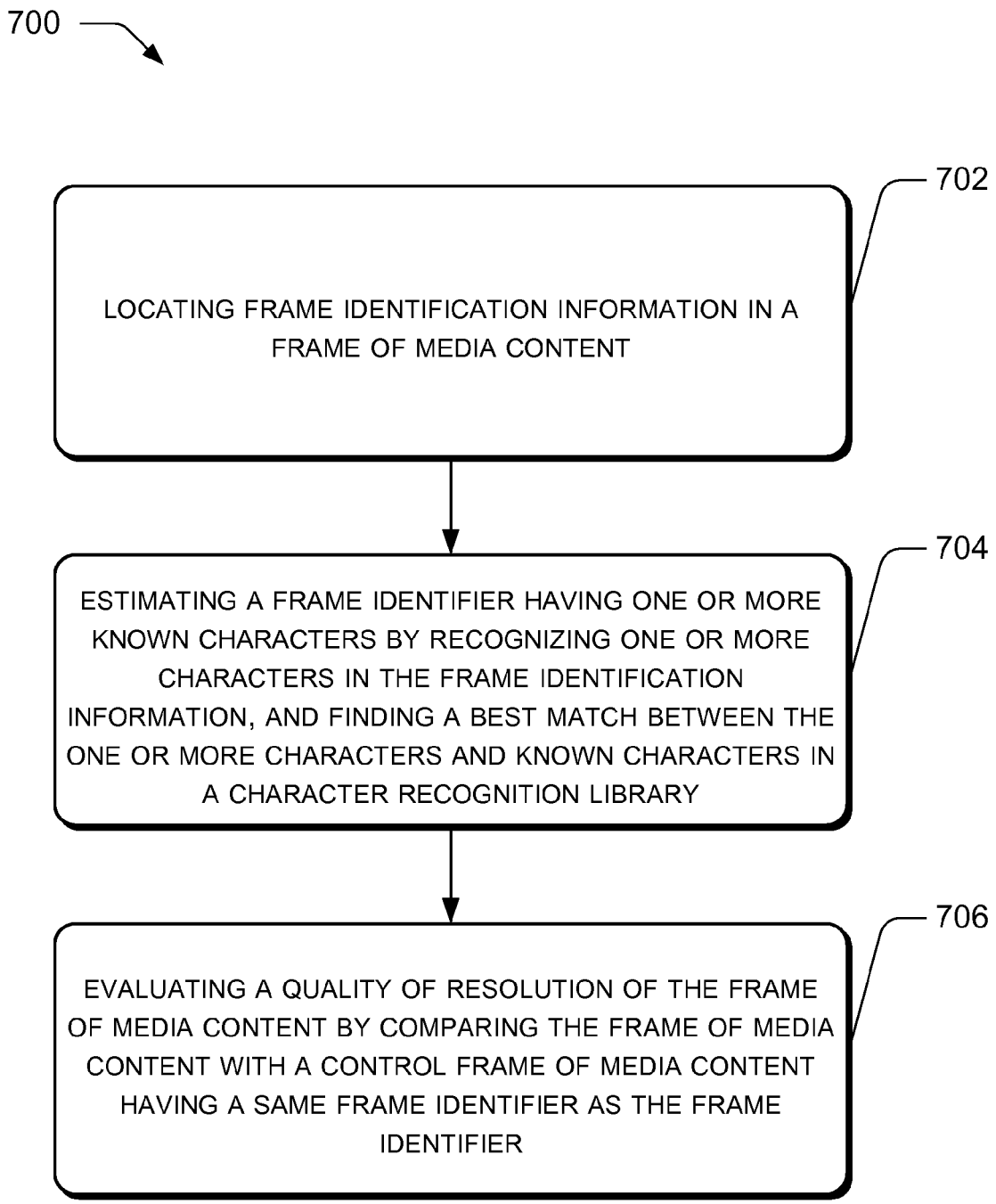
FIG. 7 illustrates another exemplary process for identifying character information in media content.

FIGS. 5-7 illustrate exemplary methods for implementing aspects of identifying character information in media content. The methods are illustrated as a collection of blocks in a logical flow graph representing a sequence of operations that can be implemented in hardware, software, firmware or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described therein. In the context of software, the blocks can represent computer instructions that, when executed by one or more processors, perform the recited operations. Moreover, for purposes of discussion, and not purposes of limitation, selected aspects of the methods may be described with reference to elements shown in FIGS. 1-4.

Exemplary Method I

FIG. 5 illustrates an exemplary method 500 for recognizing and identifying character information in media content. At block 502, at least one individual character in frame identification information in a frame of media content is recognized. For example, one or more characters in frame identification information 300 can be recognized while frame 108 is being rendered at client device 102. The frame identification information in the frame of media content can include characters in a frame identifier which have suffered loss from various processes during transmission and rendering of the frame of media content. Recognition of characters in the frame identification information can be done using any method known in the art.

At block 504, the at least one character can be compared against a set of known characters in a character recognition library. The character recognition library, such as character recognition library 214, can include copies of all known characters used to populate a frame identifier corresponding to the frame identification information before the frame of media content was subjected to transmission and/or rendering processes. The copies of the known character can be of a same font size, and a same font type as the characters used to populate the frame identifier.

In one implementation, characters in the frame identification information can be viewed separately from one another, and width boundaries, such as width boundaries 302A and 302B, can be set on the right and left sides of each character in the frame identification information. The space between the width boundaries for each character can be defined as a width of the character.

Similarly, height boundaries, such as height boundaries 306A and 306B, can be set for each of the characters in the frame identification information. For example, the height boundaries can be set at a top edge and a bottom edge of each character, with the space between height boundaries being defined as a height of the character.

A search can then be conducted for known characters in the character recognition library having heights and widths similar to the heights and widths of characters in the frame identification information. Alternately, or additionally, a search can be conducted for known characters in the character recognition library having pixels in similar positions to pixels found in the characters in the frame identification information.

At block 506, at least one known character from the set of known characters can be found which best matches the at least one character in the frame identification information. For example, a best match can be found between a character recognized in the frame identification information and a known character in the set of known characters in the character recognition library.

At block 508, the at least one known character found in block 506 can be identified as the frame identifier for the frame of media content. For example, the known characters which best match the characters in the frame identification information can be inferred to be an original frame identifier placed on the frame of media content before the frame of media content was subjected to transmission and rendering processes.

Exemplary Method II

FIG. 6 illustrates an exemplary method 600 for estimating a quality of resolution of a frame of media content. At block 602, a quality of resolution at the least one character recognized in the frame of media content in method 500 is calculated. For example, each character recognized in the frame of media content can be compared to a corresponding best matching known character from the character recognition library. Such similarity measures can be conducted for all recognized characters in the frame of media content and their best matching known characters in the character recognition library.

Any methods known in the art can be used to find the degree of similarity between the recognized characters in the frame of media content and their corresponding best matching known characters from the character recognition library. In one implementation, the degree to which the characters in frame identification information are similar to their corresponding equivalent known characters in the character recognition library can be calculated by comparing pixels. For instance, a pixel having a color above a predetermined threshold in a character in the frame identification information can be compared to a corresponding pixel in the corresponding equivalent known character in the character recognition library. If the pixel in the character in the frame identification information matches the pixel in the best match known character in character recognition library, then a match can be declared. Otherwise a pixel mismatch can be declared. This process can be repeated for each pixel above the predetermined threshold in the characters in frame identification information. In such a manner, the quality of resolution of the characters recognized in the frame of media content can be calculated as:

$$QOR \text{ of Frame } ID \text{ Info } 300 = \frac{\text{Number of Pixel Matches}}{\text{Number of Pixel Matches} + \text{Number of Pixel Mismatches}}$$

At block 604, a quality of resolution of the frame of media content can be inferred from the quality of resolution of the at least one character recognized in the frame of media content. For example, the characters recognized in the frame of media content can be viewed as a representative sample of the frame of media content. As a result, the quality of resolution of the frame of media content can be inferred to be the same as the quality of resolution of the least one character recognized in the frame of media content.

Exemplary Method III

FIG. 7 illustrates an exemplary process for recognition and identifying character information in media content. At block 702, frame identification information is located in a frame of media content. For example, frame identification information 300 can be located in located in frame 108. In one implementation, the frame identification information can be located in a same area of each frame in a file of media content. In another implementation, the frame identification information can be in differing locations throughout frames in a file of media content. The differing locations of the frame identification information in the frame of media content can be predictable (i.e. can follow a set pattern), or the differing locations can be random.

At block 704, a frame identifier is estimated from the frame identification information. For example, characters within the frame identification information can be isolated and best matches between the characters within the frame identification information and known characters within a character recognition library, such as character recognition library 214, can be found.

Best matches between the characters within the frame identification information and the known characters within the character recognition library can be found using any technique known in the art. For example, characters within the frame identification information can be classified based on their widths and heights, and the characters within the frame identification information can be compared to known characters in the character recognition library having the same or similar dimensions.

Alternately, or additionally, pixels in the characters within the frame identification information can be compared to pixels in the known characters in the character recognition library, with a best match being a known character having a maximum number of shared pixels with a character within the frame identification information.

At block 706 a quality of resolution of the frame of media content can be evaluated by comparing the frame of media content with a control frame of media content having a same frame identifier as the frame identifier estimated in block 704. In one implementation, the frame of media content is a copy of the control frame. In another implementation, the comparison of the frame of media content with the control frame of media content can take place after the frame of media content has been rendered.

The frame of media content can be compared to a control frame of media content stored on a remote device, such as device 104C, in a control frame cache, such as CF cache 120. Moreover, comparison of the frame of media content and the control frame of media content can be conducted using any method known in the art. For example, each pixel in the frame of media content can be compared to each corresponding pixel in the control frame of media content. In such an implementation, the quality of resolution of the frame of media content can be evaluated based on the number of similar pixels between the frame of media content and the control frame of media content.

CONCLUSION

Although embodiments of identifying character information in media content have been described in language specific to structural features and/or methods, it is to be understood that the subject of the appended claims is not necessarily limited to the specific features or methods described. Rather, the specific features and methods are disclosed as exemplary implementations of identifying character information in media content.

What is claimed is:

1. A method comprising:
    recognizing at least one character of frame identification information in a frame of media content;
    comparing the at least one character against a set of known characters in a character recognition library;
    finding at least one known character from the set of known characters which best matches the at least one character;
    identifying the at least one known character as a frame identifier for the frame of media content;
    calculating a quality of resolution of the at least one character based on a degree of similarity between the at least one character and the at least one known character; and
    estimating a quality of resolution of the frame of media content based on the quality of resolution of the at least one character.

2. A method as recited in claim 1, wherein the recognizing includes finding the at least one character at a known location in the frame of media content.

3. A method as recited in claim 1, wherein the calculating includes computing the degree of similarity by dividing a total number of matching pixels between the at least one character and the at least one known character by a sum of the total number of matching pixels and a total number of nonmatching pixels between the at least one character and the at least one known character.

4. A method as recited in claim 1, further comprising:
    accessing a time of recordation of the frame of media content based on the frame identifier;
    calculating an expected time of rendering of the frame of media content based on the time of recordation of the frame identifier; and
    registering that the media content is being rendered incorrectly when a time at which the frame of media content is rendered differs from the expected time of rendering of the frame of media content.

5. A method as recited in claim 4, wherein the calculating includes:
    identifying a second frame identifier associated with a second frame of media content, the second frame of media content being in a same file as the frame of media content;
    accessing a time of recordation of the second frame of media content based on the second frame identifier;
    computing an expected amount of time between a rendering of the second frame of media content and a rendering of the frame of media content based on the time of recordation of the second frame of media content and the time of recordation of the frame of media content; and
    computing the expected time of rendering of the frame of media content as being a time of rendering of the second frame of media content plus the expected amount of time between the time of recordation of the second frame of media content and the time of recordation of the frame of media content.

6. A method as recited in claim 1, further comprising:
    identifying a second frame identifier associated with a second frame of media content, wherein the second frame of media content is in a same file as the frame of media content, and further wherein a media function is activated at a time of rendering of the second frame of media content and deactivated at a time of rendering of the frame of media content;

registering that the media content is being rendered incorrectly if a time between the time of rendering of the second frame of media content and the time of rendering of the frame of media content is unequal to an accelerated elapsed time, wherein the accelerated elapsed time is calculated by dividing a difference between a time of recordation of the second frame based on the second frame identifier and a time of recordation of the frame based on the frame identifier, by an advance rate of the media function.

7. A method as recited in claim 1, further comprising:
determining a second frame identifier for a second frame of media content rendered immediately proximate to the frame of media content;
ascertaining that one or more frames of media content have been dropped if the second frame identifier is not immediately proximate in sequence to the frame identifier.

8. A tangible computer-readable storage medium having computer-readable instructions residing thereon that, when executed, perform acts comprising:
locating frame identification information in a frame of media content;
estimating a frame identifier having one or more known characters by recognizing one or more characters in the frame identification information, and finding a best match between the one or more characters and a set of known characters in a character recognition library;
determining a second frame identifier for a second frame of media content rendered immediately proximate to the frame of media content; and
ascertaining that one or more frames of media content have been dropped if the second frame identifier is not immediately proximate in sequence to the frame identifier.

9. A tangible computer-readable storage medium as recited in claim 8 having a set of computer-readable instructions that, when executed, perform acts further comprising calculating a quality of resolution of the frame identification information based on a degree of similarity between the one or more characters in the frame identification information and the one or more known characters in the frame identifier.

10. A tangible computer-readable storage medium as recited in claim 9 having a set of computer-readable instructions that, when executed, perform acts further comprising estimating a quality of resolution of the frame of media content based on the quality of resolution of the frame identification information.

11. A tangible computer-readable storage medium as recited in claim 8 having a set of computer-readable instructions that, when executed, perform acts further comprising evaluating a quality of resolution of the frame of media content by comparing the frame of media content with a control frame of media content having a same frame identifier as the frame identifier, wherein the frame of media content is based on the control frame of media content.

12. A computing-based device comprising:
a processor;
a memory including a quality sampling module comprising:
a character recognition module configured to:
recognize frame identification information including one or more characters in a frame of media content; and
identify a frame identifier including one or more known characters from among a set of known characters in a character representation library, wherein the one or more known characters are a best match between the one or more characters in the frame identification information and the set of known characters; and
a resolution quality module configured to:
compute a quality of resolution of the frame identification information by computing a similarity between the one or more known characters in the frame identifier and the one or more characters in the frame identification information, wherein the computing the similarity includes dividing a total number of matching pixels between the one or more characters in the frame identification information and the one or more known characters in the frame identifier by a sum of the total number of matching pixels and a total number of nonmatchinq pixels between the one or more characters in the frame identification information and the one or more known characters in the frame identifier; and
estimate a quality of resolution of the frame of media content based on the quality of resolution of the frame identification information.

13. A computing-based device as recited in claim 12, wherein the character representation library resides in the memory.

14. A computing-based device as recited in claim 12, wherein the character representation library includes one or more of:
arabic numerals;
roman letters.

15. A computing-based device as recited in claim 12, wherein the quality sampling module further comprises a playback calibration module configured to determine if the frame of media content is being rendered correctly by comparing an expected presentation time associated with the frame identifier with an actual presentation time associated with the frame identifier.

16. A computing-based device as recited in claim 12, wherein the quality sampling module further comprises a playback calibration module configured to determine that audio content and video content in the media content are being rendered in synch if an actual presentation time of a frame of video content is the same as an actual rendering time of a portion of audio content, wherein the frame of video content has a frame identifier indicating that the frame of video content is to be rendered at the same time as the portion of audio content.

\* \* \* \* \*